United States Patent [19]

Bubak

[11] Patent Number: 4,574,926
[45] Date of Patent: Mar. 11, 1986

[54] OIL COOLED AND FLUID PRESSURE OPERATED CLUTCH ASSEMBLY

[76] Inventor: John Bubak, 733 Sunnybeach, Pontiac, Mich. 48054

[21] Appl. No.: 508,406

[22] Filed: Jun. 28, 1983

[51] Int. Cl.[4] .............................................. F16D 19/00
[52] U.S. Cl. ............................ 192/18 A; 192/85 AA; 192/106 F; 192/70.12
[58] Field of Search .......... 192/85 AA, 113 B, 18 A, 192/106 F, 70.12, 4 B

[56] References Cited

U.S. PATENT DOCUMENTS

| | | | |
|---|---|---|---|
| 2,636,581 | 4/1953 | Bitler | 192/85 AA |
| 2,837,192 | 6/1958 | Dunkelow | 192/85 AA |
| 2,869,701 | 1/1959 | Yokel | 192/85 AA |
| 3,157,257 | 11/1964 | Root | 192/18 A |
| 3,198,295 | 8/1965 | Fangman et al. | 192/113 B |
| 3,209,872 | 10/1965 | Moyer et al. | 192/18 A |
| 3,213,989 | 10/1965 | Harting | 192/86 |
| 3,314,513 | 4/1967 | Lake et al. | 192/91 R |
| 3,334,717 | 8/1967 | Spokas et al. | 192/113 B |
| 3,366,210 | 1/1968 | Webster | 192/113 B |
| 3,432,014 | 3/1969 | Iwamatsu et al. | 192/18 A |
| 3,610,384 | 10/1971 | Borck | 192/103 B |
| 3,667,583 | 6/1972 | Richards | 192/105 A |
| 3,744,608 | 7/1973 | Newman | 192/105 A |
| 3,768,613 | 10/1973 | Brunner | 192/113 B |
| 3,848,622 | 11/1974 | Cummings | 192/82 T |
| 4,091,905 | 5/1978 | Sieren et al. | 192/113 B |
| 4,094,393 | 6/1978 | Spokas | 192/113 B |
| 4,282,775 | 8/1981 | Van Dest | 74/740 |
| 4,425,879 | 1/1984 | Shadday et al. | 192/106 F |

FOREIGN PATENT DOCUMENTS

| | | | |
|---|---|---|---|
| 2441762 | 6/1980 | France. | |
| 2009354 | 6/1979 | United Kingdom | 192/113 B |

Primary Examiner—Craig R. Feinberg
Assistant Examiner—David A. Okonsky

[57] ABSTRACT

An oil cooled and hydraulically operated clutch assembly (10) in which the cooling oil is contained within the clutch housing (18) after cooling and is scavenged by scavenger means including a pitot-like tube (94) during rotation of the clutch housing (18). An output shaft (20) passes through an aperture in the rear of the housing (18), the forward end of which is secured to an engine flywheel (12). Sealing means (52, 84) provide an oil seal between the periphery of the output shaft and the aperture. An annular piston (56) is disposed within the housing and is caused to be moved between disengaged and engaged positions and is operable when in the engaged position to cause clutch disks (26) to be held between the piston (56), a reaction surface (76) on the clutch housing and steel plates (28) for rotation therewith. A non-rotatable annular member (24) extends between the lip (50) which forms the aperture and the output shaft (20) and provides various passageways.

17 Claims, 5 Drawing Figures

OIL COOLED AND FLUID PRESSURE OPERATED CLUTCH ASSEMBLY

FIELD OF THE INVENTION

The present invention relates generally to clutches, and more particularly to that form of clutch which is utilized for coupling an engine to a transmission within a vehicle or the like.

BACKGROUND OF THE INVENTION

Various formes of clutches are well known in the vehicle industry for coupling engines to transmissions. These clutches can be categorized in differing manners, but one common categorization of the clutches is "wet" and "dry". A dry clutch is provided with a friction material which is maintained in a dry state and is adapted to be clamped between a reaction surface and a pressure plate when the clutch is engaged. As the design torque loading increases it is either necessary to increase the diameter of the clutch plate, to use multiple clutch plates, or to increase the force of clamping, requiring harder friction materials in order to reduce excessive wear.

Typically, because of the various design criteria set forth above, a dry clutch used in a high-torque environment requires a high pedal effort for its disengagement. Also, large diameter friction disks have high inertia forces which cause excessive drag forces during the shifting of gears. High inertia forces of the clutch also complicate the design of synchromesh transmissions. It has long been recognized in the industry that improved clutch service life can be achieved by utilizing wet clutches. In a wet clutch a cooling oil is passed over the surface of the friction material to prevent it from overheating and rapidly wearing. A typical wet clutch is hydraulically operated, having a plurality of interleaved clutch disks and spacers and operates in a sealed compartment. While this form of construction has improved durability characteristics over the aforementioned dry clutches, it has other drawbacks in that it is necessary to provide a sealed drive train compartment between the engine and the front of the transmission.

OBJECTS AND SUMMARY OF THE INVENTION

It is an object of the present invention to provide an improved oil cooled and fluid pressure operated clutch assembly.

More particularly, it is an object of the present invention to provide an oil cooled and hydraulically operated clutch assembly characterized in part by a clutch housing securable to a flywheel or the like for rotation therewith, the clutch housing being capable of containing oil and also having contained therein one or more axially movable clutch disks which are connected to an output shaft, and an hydraulically operated piston axially movable between engaged and disengaged position. By utilizing such a design it is possible to dispose the oil cooled and hydraulically operated clutch assembly within a dry compartment. Thus, it is not necessary to provide a special compartment for the clutch assembly, nor is it necessary to seal the compartment of leakage paths, such as for a starter ring gear, inspection aperture, and to provide a special crankshaft seal to prevent oil interchange between the engine and transmission.

It is a further object of the present invention to provide an oil cooled and hydraulically operated clutch assembly of the type set forth above wherein no complex and costly pumping mechanism is required to scavenge the clutch cavity of cooling oil. To this end an oil containing clutch housing is secured to the flywheel for rotation therewith, and a pitot-like tube is provided, the tube being disposed within the housing and held from rotating with the housing.

The above objects and other objects and advantages of the present invention will become more apparent after a consideration of the following detailed description taken in conjunction with the accompanying drawings in which a preferred form of this invention is illustrated.

DETAILED DESCRIPTION

Oil Cooled and Hydraulically Operated Clutch Assembly

Figure 1:
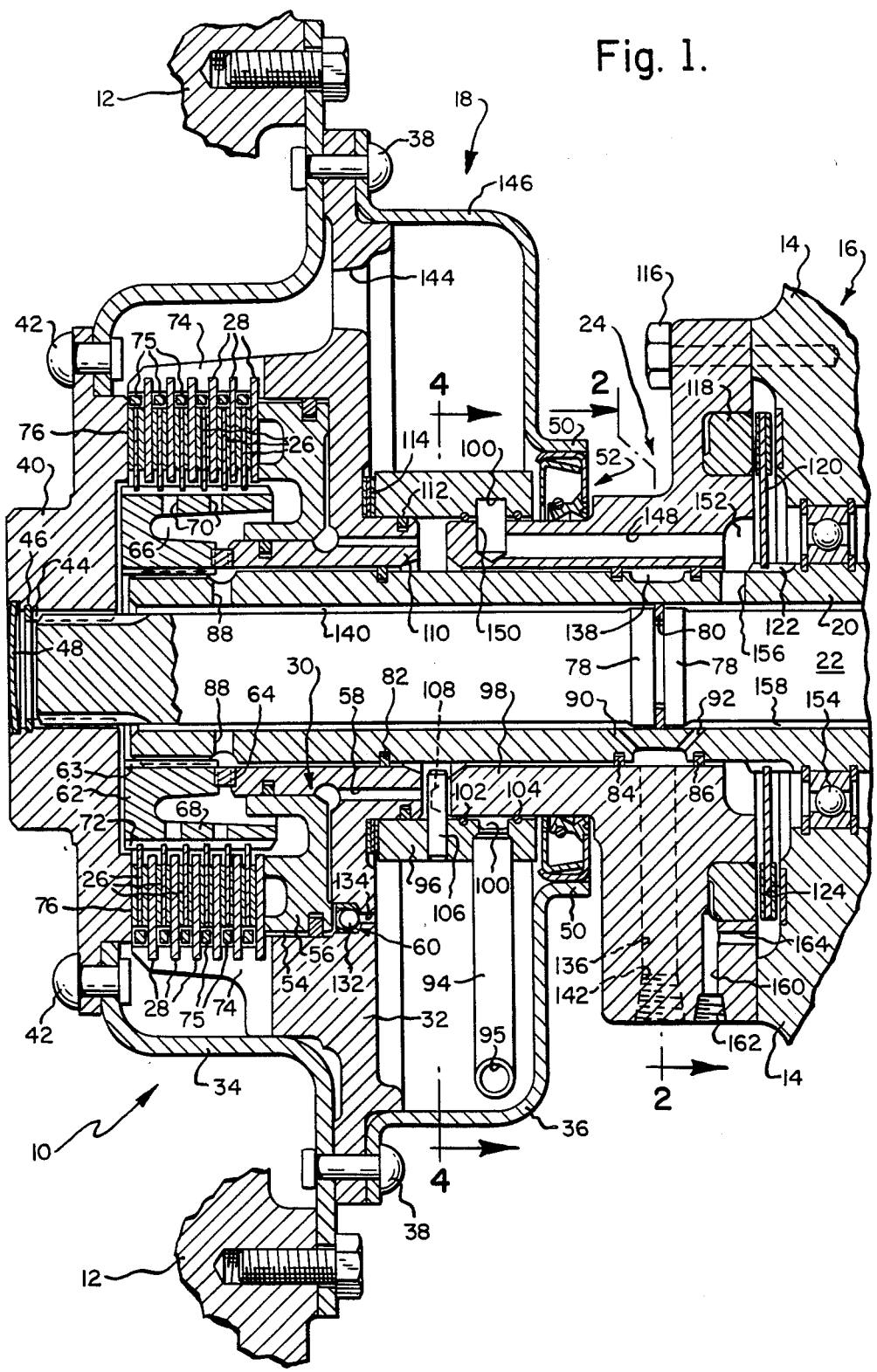
FIG. 1 is a sectional view of an oil cooled and hydraulically operated clutch assembly showing how it is interrelated with a flywheel and a transmission housing of a vehicle, and additionally showing a transmission brake external of the clutch assembly and the transmission housing, portions being shown somewhat schematically.

Referring first to FIG. 1, an oil cooled and hydraulically operated clutch is indicated generally at 10. This clutch is operatively disposed between an engine flywheel 12 and a transmission which is disposed within a transmission housing 14. In addition to the clutch 10, a transmission brake, which will be described below, is indicated generally at 16, and is disposed between the clutch and the transmission housing 14.

The clutch assembly 10 includes a number of major operative components including a clutch housing indicated generally at 18, an output or drive shaft 20, which is also the input shaft to the transmission, and a power takeoff (PTO) shaft 22 which is coaxial with the output shaft 20 and is, in fact, disposed within the output shaft. The transmission may be of the type shown in U.S. Pat. No. 4,282,775, the disclosure of which is incorporated herein by reference thereto. Other components of the clutch assembly are a non-rotatable support member, indicated generally at 24, in which various fluid conduits or passageways are disposed, sealing means which extend between the housing 18 and the output shaft 20, and one or more axially shiftable clutch disks 26 which are interleaved with steel plates 28, the clutch disks being interconnected with the output shaft 20 for rotation therewith. Additional elements of the clutch are fluid pressure operated engaging means, indicated generally at 30, which is capable of causing the clutch disks 26 to be held for rotation with the clutch housing 18, fluid means capable of introducing cooling oil into the clutch housing, and scavenging means capable of removing the cooling oil from the housing.

It is a feature of the clutch housing 18 that the oil used for cooling the clutch disks is contained within the housing during rotation and is subsequently scavenged by the scavenging means for removal to a location exterior of the clutch housing. This feature permits the utilization of the clutch assembly within a drive train housing which extends between an engine and transmission and which is not sealed, thus eliminating the necessity of sealing apertures used for the starting motor, inspection hole, etc.

The clutch housing 18 includes a machined central portion 32, a forward drive flange 34, and a rear seal carrier 36. The central portion 32, the forward drive flange 34, and the rear seal carrier 36, are secured to each other by means of rivets 38. A PTO drive hub 40 is secured to the forward drive flange 34 by means of rivets 42. The drive hub is provided with an internal aperture coaxial with the flywheel 12, which aperture is provided with splines 44. Disposed to one side of the splines are a snap ring 46 and a seal 48. The forward end of the PTO shaft is splined and interengages the splines 44, which will cause the PTO shaft 22 and clutch housing to rotate together. The rear seal carrier 36 has a cylindrical lip 50 which defines an aperture to the rear of the housing 18, the lip having a seal assembly 52 mounted herein. The seal assembly 52 is part of the sealing means which will be described further below.

The machined central portion 32 is provided with an annular piston chamber 54 which receives an annular piston 56 capable of axial movement between engaged and disengaged positions, the disengaged position being illustrated in FIG. 1. A bore 58 extends to one side of the chamber 54 for the introduction of hydraulic fluid into the chamber 54. A portion of the machined central portion 32 is provided with a centrifugal check valve assembly 60 which facilitates the discharge of hydraulic fluid from the chamber 54 when the piston 56 is being moved to its retracted position.

Mounted on the forward end of the output shaft 22 is a clutch output drive hub 62. As can be seen from FIG. 1, the hub is provided with internal splines 63 which engage external splines on the shaft 20. A separator in the form of a wave washer 64 is disposed between the inner rear surface of the clutch output drive hub 62 and a corresponding portion of the machined central portion 32. This separator permits the flow of oil between the drive hub 62 and the machined central portion 32. As can be seen from FIG. 1 the drive hub 62 is provided with an internal annular recess 66 and a radial outer cylindrical portion 68 provided with apertures 70 through which cooling oil may flow. The outer surface of the radial outer cylindrical portion 68 is provided with keys or splines 72 on which the clutch disks 26 are mounted for sliding axial movement. The machine central portion is provided with circumferentially spaced apart forwardly extending portions 74 to which the steel plates 28 are keyed for axially sliding movement. Disposed between the steel plates 28 beyond the periphery of the clutch disks 26 are wave washers 75 which will force the plates apart when the piston 56 is in its retracted position. Thus, when the piston is in the retracted position as shown in FIG. 1, the clutch disks will be free to rotate relative to the steel plates and drive hub 40. However, when the piston 56 is caused to be moved to the left to its engaged position it will compress the wave washers 75, and cause the clutch disks 26 to be engaged between the steel plates 28 and the reaction surface 76 of the drive hub 40, thereby causing said clutch disks 26 to rotate with the hub 40 and to cause attendant rotation of the shaft 20.

As can be seen from FIG. 1 the PTO shaft 22 is disposed within the output shaft 20. As can be further seen, except for a midportion 78 provided with a fluid seal 80, the diameter of the PTO shaft 22 is less than the internal diameter of the output shaft 20. Thus there are spaces between the two shafts extending forwardly and rearwardly of the seal 80 and enlarged portion 78 which can serve as fluid passageways.

The output shaft 20 is provided with axially spaced apart fluid seals 82, 84, 86. In addition, the output shaft is provided with first, second, and third axially spaced apart sets of radially extending bores 88, 90, 92, respectively. The seal assembly 52 and the seal 84 act as the sealing means which are operable to provide an oil seal between the periphery of the output shaft and the aperture in the end of the housing as defined by lip 50.

The scavenger means includes a pitot-like tube 94 disposed within the housing 18 and supported on the non-rotatable support member 24. As can be seen the pitot-like tube 94 has an open end 95 disposed adjacent the periphery of the housing 18, 36 and is capable of scavenging any cooling oil or piston fluid from within the housing in the event that there is relative rotation between the housing and the pitot-like tube. When there is such relative rotation, the rotational velocity of the housing 18 will impose a force reaction on the oil due to its mass density, the shear force creating a velocity and a pressure gradient. As the scavenger assembly is essentially stationary, a hydraulic pressure head will be created, and consequently, oil will flow into the pitot-like tube. As can be seen the pitot-like tube is secured to a cylindrical member 96 which is journaled about a annular portion 98 of the non-rotatable support member 24. The cylindrical member 96 is provided with an annular chamber 100 which is maintained in a fluid sealed relationship with the outer surface of the annular portion 98 by seals 102, 104 in the form of O rings. As can further be seen the cylindrical member 96 would be free to rotate about the axis of the output shaft 20 and the annular portion 98 if means to restrain its rotational movement were not provided. Such means are provided in the form of a pin 106 which passes through a suitable aperture in the cylindrical member 96 and engages a projection 108 of the annular portion 98. The forward end of the cylindrical member 96 overlies a rearward cylindrical projection 110 of the machined central portion 32 of the housing 18 and is held in a sealed relationship therewith by means of a fluid seal 112. A bearing 114 is disposed between the forward end of the cylindrical member 96 and an associated portion of the central portion 32 of the housing 18.

The non-rotatable member 24 is secured to the transmission housing 14 by means of bolts 116, only one being shown in FIG. 1. The non-rotatable housing serves in part as a housing for the transmission brake and is provided with an annular chamber which receives an annular piston 118 which can be moved between a retracted position, such as that shown in FIG. 1, to an extended position wherein it engages a transmission brake disk 120 which is secured to an intermediate splined portion 122 on shaft 20. When the transmission brake piston is caused to be moved from its retracted position to its extended position the brake disk 120 will be trapped between the piston 118 and a reaction surface 124 on the transmission housing 14.

Figure 2:
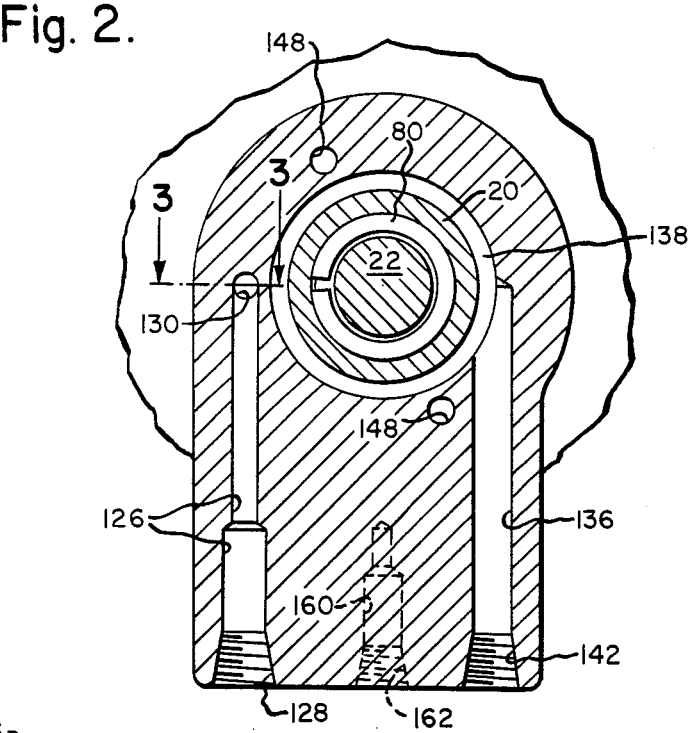
FIG. 2 is a sectional view taken generally along the line 2—2 in FIG. 1 showing the relationship of various fluid passageways as they actually exist in a preferred embodiment.
Figure 4:
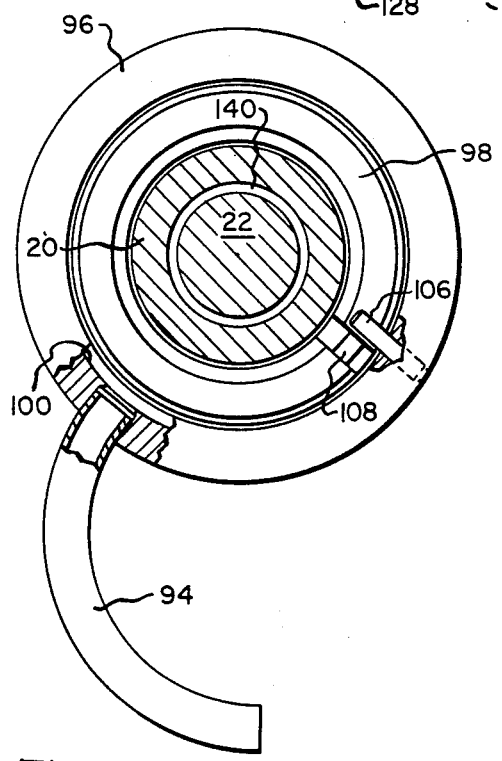
FIG. 4 is a sectional view taken along the line 4—4 in FIG. 1 and showing the relationship of various parts as they actually exist in a preferred embodiment.
Figure 3:
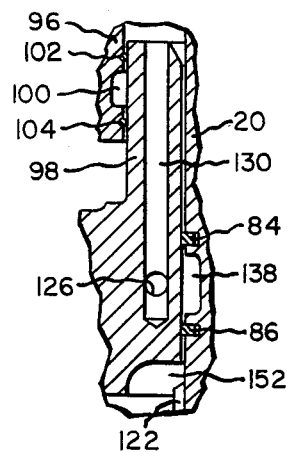
FIG. 3 is a sectional view taken generaly along the line 3—3 in FIG. 2.

The non-rotatable member 24 is also provided with various passageways. These passageways are shown somewhat schematically in FIG. 1 but their actual construction in a preferred embodiment is shown more accurately in FIGS. 2 and 3. Thus, a control passageway a first conduit for controlling the operation of the piston 56 is provided, the first conduit including a first bore 126 provided with a threaded end portion 128 for the reception of a suitable fluid fitting. The bore 126 extends inwardly to an axially extending bore 130 (FIG. 3) which terminates at a forward end of the cylindrical extension 98. Fluid introduced under pressure into the bore 126 will flow through the bore 126, bore 130, and into the further bore 58 by means of the passageway defined by the chamber between the cylindrical member 96 and the output shaft 20 and isolated by seals 112, 82, 84 and 102. The continued introduction of fluid under pressure into the first conduit comprising bores 126, 130 and 58 will thus cause the piston 56 to be moved from its retracted position towards its engaged position. When this happens, the fluid will force the ball 132 of the check valve assembly into its seat, preventing further loss of fluid through the check valve passageway 134. The piston chamber and first conduit are all part of a first fluid system.

The non-rotatable member 24 is provided with a second or coolant conduit which includes another bore 136 parallel to the first bore 126 which bore extends through the non-rotatable member 24 to annular chamber 138 which is defined in part by the periphery of the output shaft 22 between seals 84 and 86. Chamber 138 is in turn in communication through bore 90 with the fluid passageway 140 which is formed by the space between the PTO shaft 22 and the internal diameter of the output shaft 20 forward of the seal 80. As in the case with the bore 126, the bore 136 is provided with a threaded end portion 142 for the reception of a suitable fluid fitting. Cooling oil or fluid introduced into the bore 136 through the fitting disposed within the threaded end portion 142 will then flow through the second passageway formed of bore 136, bore 90, fluid passageway 140, bore 88, annular recess 66, apertures 70, and past the clutch disks 26 serving to lubricate and cool the disks. These various components make up a second fluid system (or means). As the hub 40 rotates such cooling oil will be thrown by centrifugal force to the periphery of the forward drive flange 34 and will then exit through the apertures 144 formed in the machined central portion 32 and lie against the periphery 146 of the rear seal carrier housing portion 36. As the cooling oil and any piston oil which exits through the check valve passageway 34 will have a rotation imparted to it by the rotating housing 18, it will be scooped up by the pitot-like tube 94 and forced inwardly of the tube and into chamber 100. The chamber 100 is in turn interconnected with an axially extending bore 148 in member 24 by a radially outwardly extending passageway 150. Thus, flow from the pitot-like tube will be through third passageway means formed of chamber 100, bore 150, and bore 148. This flow will be discharged into chamber 152 disposed between the rear of the non-rotatable member 24 and the forward wall of the transmission housing 14. Fluid from chamber 152 can in turn be discharged to the interior of the transmission either through the ball bearing assembly 154 or through radial bores (not shown) in the shaft 20 disposed within the transmission housing, the bores being in communication with the chamber 152 by means of a radial bore 156 in the output shaft disposed adjacent the chamber 152, and a passageway 158 extending between the periphery of the PTO shaft 22 and the internal diameter of the output shaft 20. Additional fluid flow to the passageway 158 is provided in order to insure for proper lubrication of the transmission. This is accomplished through the bore 92 in the output shaft, the bore 92 being in communication with passageway 158. It should be noted that as the bores 90 and 92 act as restrictors, the normal pressure in passageways 140 and 158 from the flow of fluid into the bore 136 will be quite low. Thus the fluid within bore 158 will not offer any back pressure resistance downstream of bore 92 with respect to the flow of fluid from the pitot-like tube which operates at a substantially higher pressure when it is in fact scooping up excess oil.

At this point it should be observed that as the cooling oil and the fluid used for causing the pistons to be moved from their disengaged positions to their engaged positions are subsequently merged, a single grade of fluid will be used for these purposes.

As previously noted the transmission brake disk 120 is caused to be engaged between the annular piston 118 and a reaction surface 124 by causing fluid under pressure to be introduced behind the pistons 118. To this end the non-rotatable member 24 is provided with a further bore 160 which is in direct communication with the chamber behind the piston 118, this further bore 160 also being provided with a threaded end portion 162 to which a suitable hydraulic fitting may be secured. During the operation of the transmission brake 16 a relatively large supply of oil is fed into the bore 160, excess fluid not required for the operation of the piston 118 passing through bore 164 into chamber 152 for the purpose of cooling the brake disk 120.

At this point it should be observed that in normal operation fluid will constantly be flowing into bore 136 through a fitting threaded into the threaded end portion 142, the flow of fluid being necessary to constantly provide transmission lubrication and also to provide cooling oil for the clutch disks when desired. However, the flow into the bores 126 and 160 will be regulated by suitable control valves to insure their proper operation and also to insure that the transmission brake is not engaged when the clutch is engaged, and vice versa. To this end a control assembly including suitable control valves is provided.

CONTROL ASSEMBLY

Figure 5:
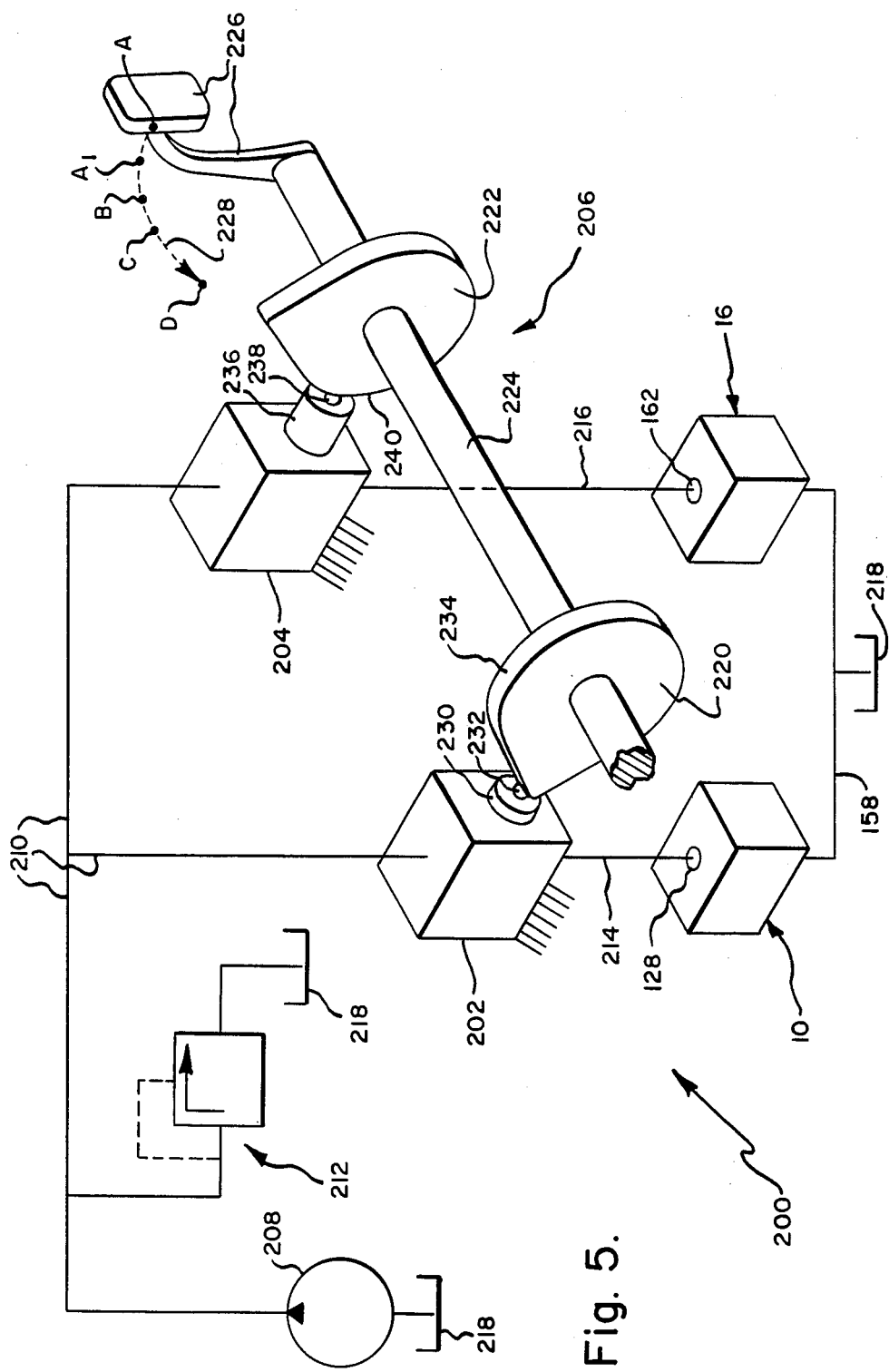
FIG. 5 is a schematic view illustrating a control assembly which may be utilized for engaging and/or disengaging the clutch and transmission brake.

The control assembly is illustrated in FIG. 5 and is designated generally by the reference numeral 200. The control assembly includes independently operable control valves 202, 204 which control valves are disposed to the exterior of the clutch assembly 10 and the transmission brake 16. The control valves are adapted to be operated by valve operating assembly indicated generally at 206.

The control valves 202 and 204 are connected on their input side with a source of fluid under pressure, which is represented by pump 208, by fluid lines collectively indicated at 210. A pressure regulating valve 212 is in communication with the fluid lines 210 and in normal operation establishes the pressure in the lines 210 at the input side of the control valves at approximately 20 Bars. The output side of valve 202, which is used for controlling the operation of the clutch assembly 10, is connected to line 214 which is in turn provided with a fluid coupling received within the port or threaded end portion 128 of bore 126. Similarly, the valve 204, which is used for controlling the operation of the transmission brake assembly 16, has its output side connected to line 216, which is in turn provided with a fitting which is coupled to port 142. The discharge from both the clutch assembly and the transmission brake assembly are merged into passageway 158 and are returned to the reservoir which is the transmission sump 218.

The valve operating assembly 206 includes cam lobes 220 and 222 which are mounted for simultaneous rotation, as for example being secured to a rotatable shaft 224. The shaft in turn can be rotated from a first position, illustrated in FIG. 5 and which would cause the clutch to be fully engaged and the transmission brake to be fully disengaged to another position which would cause the clutch to be fully disengaged and transmission brake to be fully engaged. As illustrated in FIG. 5 this rotation of the cam lobes would be caused by operation of a clutch pedal 226 as it moves from its raised position to its fully depressed position, which movement is indicated by the arrow 228. When the cam lobes are in the position illustrated in FIG. 5 valve 202 will be placing the chamber 54 behind piston 56 in communication with the source of fluid under pressure. Thus, in this position the valve plunger, which is provided with a ball 232 which engages cam track 234, is disposed in its left hand position. At the same time valve 204, which may be of the same construction as valve 202, has its plunger 236 disposed to the full right hand position blocking the flow of fluid from the source of fluid under pressure 208 to the port 162. Valve plunger 236 is also provided with a ball 238 which engages cam track 240.

As the operation of both the clutch assembly and transmission brake assembly are dependent upon the pressure of the fluid in the chamber behind the piston it is desirable that valves 202 and 204 be of the pressure regulating type so that the operator can better control the operation of the various components, such as for example, during inching.

OPERATION

When the control assembly is in the position illustrated schematically in FIG. 5 the clutch piston 56 will be disposed in its engaged position and fluid in chamber 56 will be subject to full system pressure as it is in communication with the source of fluid under pressure 208 through line 210, valve 202, line 214, and bores 126, 130 and 58. At the same time the fluid in the chamber behind the transmission brake piston 118 is in communication with reservoir through port or bore 164, chamber 152, and passageway 158. When the vehicle operator steps on the clutch pedal 226 it will move from its normal fully raised position illustrated in FIG. 5 and indicated at point A to a first intermediate position indicated by A1. During this initial movement the valve 202 will cause the pressure available to be quickly reduced to a first intermediate level at which point the clutch disks should be just free to start slipping. Then, as the pedal is moved from position A1 to position B the pressure behind the piston should be progressively reduced giving a controlled slip to the clutch for the purposes of inching the vehicle. Once point B is fully attained the clutch disks should be free to rotate as the piston should now be in its fully disengaged position illustrated in FIG. 1. During this movement the cam lobe 222 has not initiated any movement of the valve plunger 236 and the valve 204 continues to block the flow of fluid from the source of fluid under pressure 208 to the transmission brake 16.

When pressure is released behind the piston 56 the ball 132 will no longer be held against its seat by the pressure within the chamber 54 and centrifugal force will cause the ball to move down a radially outwardly extending ramp to open up the passageway 134 to chamber 54. This will in turn permit the fluid within chamber 54 to be exhausted by the action of the wave washers 75 into the housing 18 where it is thrown by centrifugal action towards the periphery of the rear seal carrier 36 where it can be picked up by the pitot-like tube 94.

Further movement of the pedal from point B to point C should not cause any attendant movement of either of the valve plungers 230 or 236 which should now both be in their fully extended right hand position. Finally, when the pedal is moved from position C to position D the valve plunger 236 will be depressed causing pressure to gradually build up within line 216 and the corresponding circuit to the chamber behind piston 118 causing the transmission brake to be gradually applied until the valve plunger is moved to its full left hand position wherein full system pressure is applied to the chamber behind the piston 118.

When the clutch pedal is released the transmission brake will be progressively disengaged until it is fully disengaged, the pedal will then move through a dwell period, and then the pressure behind the piston 56 will gradually build up until the pressure is such that the clutch should be fully engaged at which point further movement of the pedal to position A will cause full system pressure to be applied to the piston.

While a preferred structure in which the principles of the present invention have been incorporated is shown and described above, it is to be understood that widely differing means may be employed in the broader aspects of this invention. For example, the clutch assembly need not incorporate a PTO shaft 22 and thus the passageway 140 could be formed within the output shaft 20. Another variation could be in the employment of a single valve to replace the two separately shown valves 202, 204 which valve could be operated from a single cam lobe. Other variations will occur to those skilled in the art. Accordingly, this invention is intended to embrace all such alternatives, modifications and variations which fall within the spirit and scope of the appended claims.

What is claimed is:

1. An oil cooled and fluid pressure operated clutch assembly for use in a vehicle drive line, said clutch assembly being characterized by;
   an encapsulating clutch housing, capable of containing oil, one end of the housing being secured to a rotatable component of a vehicle drive line for rotation therewith and an opposite end of the housing being provided with an aperture having an annular periphery;
   an output shaft extending through said aperture;
   a non-rotatable support member having an annular portion extending through said aperture and being disposed about said output shaft;
   sealing means operable to provide an oil seal between the periphery of the output shaft and the periphery of said aperture;
   at least one axially movable clutch disk disposed within said clutch housing and connected with said output shaft for rotation therewith;

first fluid means including a piston chamber within said clutch housing, a piston within said piston chamber and axially movable between engaged and disengaged positions, said piston when in its engaged position causing said clutch disks to be held for rotation with said clutch housing, and first conduit means extending to the piston chamber through which fluid under pressure may be introduced to cause the piston to move to its engaged position;

second fluid means capable of introducing cooling oil into said clutch housing to be used for cooling said clutch disks, said second fluid means including second conduit means; and scavenger means capable of scavenging the oil used for cooling the clutch disks and causing it to be removed from said clutch housing.

2. The oil cooled and fluid pressure operated clutch assembly as set forth in claim 1 further characterized by having an annular portion, said scavenger being supported by said annular portion, the sealing means including a first seal extending between an external portion of the non-rotatable support member and an internal portion of said clutch housing and a second seal extending between an internal portion of the non-rotatable support member and an external surface of said output shaft.

3. The oil cooled and fluid pressure operated clutch assembly as set forth in claim 1 further characterized by the provision of a PTO shaft coaxial with said output shaft and capable of rotation independent of said output shaft, said PTO shaft being coupled to said clutch housing and disposed within said output shaft, the diameter of the PTO shaft within at least a portion of the clutch housing being less than the corresponding internal diameter of the output shaft to provide a passageway for cooling oil, said output shaft also being provided with first and second radially extending bores for the introduction of cooling fluid into said passageway and for the exiting of said cooling oil from said passageway for the purpose of cooling said one or more clutch disks.

4. The oil cooled and fluid pressure operated clutch assembly set forth in claim 1 wherein said piston is annular, a said piston chamber is annular, and said first fluid means further includes a control valve movable between first and second positions, said first conduit means extending from said control valve to said annular piston chamber for introducing fluid under pressure into said chamber when said control valve is in a first position.

5. The oil cooled and fluid pressure operated clutch assembly as set forth in claim 4 further characterized by the provision of a centrifugal check valve on a portion of said clutch housing adjacent said annular piston chamber, said centrifugal check valve opening when said control valve is in a second position thereby permitting excess fluid from within the annular piston chamber to bleed out to an interior portion of the encapsulating clutch housing, said scavenging means also being capable of scavenging the fluid used for moving the piston from its disengaged to its engaged position.

6. The oil cooled and fluid pressure operated clutch assembly as set forth in claim 1 wherein said scavenger means includes a pitot-like tube disposed within the clutch housing and having a portion adjacent the periphery of the housing for scooping up oil when the housing rotates relative to said pitot-like tube.

7. The oil cooled and fluid pressure operated clutch assembly as set forth in claim 6 wherein the first fluid means includes a control valve disposed externally of said clutch housing, said first conduit means extending to said control valve, said second fluid means includes a source of cooling oil external of said clutch housing, said second conduit means extending axially into said encapsulating clutch housing, and said scavenger means further includes third conduit means extending from said pitot-like tube to a location external of said clutch housing.

8. The oil cooled and fluid pressure operated clutch assembly as set forth in claim 7 further characterized by said first conduit means being disposed between the external surface of said output shaft and the internal surface of said non-rotatable support member, and said third conduit means extending through said support member, said pitot-like tube being supported by the annular portion of said non-rotatable support member within said clutch housing.

9. The oil cooled and fluid pressure operated clutch assembly as set forth in claim 8 further characterized by the provision of a PTO shaft coaxial with said output shaft and being disposed within said output shaft, said second conduit means extending between an external surface of said PTO shaft and an internal surface of said output shaft.

10. An oil cooled and fluid pressure-operated clutch assembly for use in a vehicle drive line having:

an encapsulating clutch housing capable of containing a coolant and provided with attachment means for securing the housing to a rotatable vehicle drive transmitting component for rotation therewith, the housing also having an aperture through which an output shaft is arranged to extend when the assembly is mounted in its operational position;

a non-rotatable support member having an annular portion arranged to extend through the aperture to surround the output shaft when the assembly is mounted in its operational position;

sealing means operable to prevent escape of oil from the housing via the aperture;

at least one first clutch element disposed within and operatively associated with the housing for rotation therewith; at least one second clutch element disposed within and arranged to be operatively associated with the output shaft for rotation therewith;

fluid pressure-operated engaging means disposed within the clutch housing and movable between disengaged and engaged positions, and first conduit means entering said housing via the non-rotatable support member for supplying fluid under pressure to said engaging means for the operation thereof, said engaging means when in said engaged position bringing said first and second clutch elements into engagement to provide drive between the housing and the output shaft;

second conduit means entering said housing via the non-rotatable support member and separate from said first conduit means for introducing coolant fluid into said housing, said second conduit means allowing cooling of the first and second clutch elements when the engaging means is moving between its disengaged and engaged positions; and scavening means for scavening and removing coolant from the housing.

11. A clutch assembly according to claim 10 in which the fluid pressure-operated engaging means comprises an hydraulically operated piston within a chamber formed in part of the housing, the chamber being provided with a centrifugal check valve which is arranged to open when hydralic fluid is not being supplied under pressure to the chamber thereby permitting clutch engaging fluid to bleed out of the chamber into an interior portion of the housing, said clutch engaging fluid also being removed from the housing by the scavenging means.

12. A clutch assembly according to claim 10 in which the sealing means comprises a first seal arranged to act between an external surface of the annular portion of the support member and the clutch housing and a second seal arranged to act between an internal surface of the annular portion of the support member and the output shaft.

13. A clutch assembly according to claim 10 in which the scavenging means includes a non-rotatable pitot-like tube disposed within the clutch housing and supported from the annular portion of the non-rotatable support member, the tube having a portion adjacent an outer peripheral portion of the interior of the housing for scooping up fluid when the housing rotates relative to the pitot-like tube.

14. A clutch assembly according to claim 10 in which the output shaft is hollow and a power take-off shaft is arranged to extend co-axially down the center of the output shaft, the power take-off shaft being coupled with the clutch housing for co-rotation therewith.

15. A clutch assembly according to claim 14 is which a portion of the second conduit means is provided by an annular passageway formed by clearance between the output shaft and the power take-off shaft, the output shaft also being provided with first and second radial bores for the introduction of coolant fluid in to the annular passageway and the exiting of coolant fluid from the passageway to cool said clutch elements.

16. An oil cooled and fluid pressure-operated clutch assembly for use in a vehicle drive line having:
an encapsulating clutch housing capable of containing a coolant and provided with attachment means for securing the housing to a rotatable vehicle drive transmitting component for rotation therewith, the housing also having an aperture through which an output shaft is arranged to extend when the assembly is mounted in its operational position;
a non-rotatable support member having an annular portion arranged to extend through the aperture to surround the output shaft when the assembly is mounted in its operational position;
sealing means operable to prevent escape of oil from the housing via the aperture;
at least one first clutch element disposed within and operatively associated with the housing for rotation therewith;
at least one second clutch element disposed within and arranged to be operatively associated with the output shaft for rotation therewith;
fluid pressure-operated engaging means disposed within the clutch housing and movable between disengaged and engaged positions, and first conduit means entering said housing via the non-rotatable support member for supplying fluid under pressure to said engaging means for the operation thereof, said first conduit means including an annular passageway disposed between the external surface of the output shaft and the internal surface of the annular portion of the support member, said engaging means when in said engaged position bringing said first and second clutch elements into engagement to provide drive between the housing and the output shaft;
second conduit means entering said housing via the non-rotatable support member and separate from said first conduit means for introducing coolant fluid into said housing, said second conduit means allowing cooling of the first and second clutch elements when the engaging means is moving between its disengaged and engaged positions; and
scavenging means for scavenging and removing coolant from the housing, said scavenging means comprising a pitot-like tube supported within the housing from the annular portion of the support member and a fluid conduit means extending from the pitot-like tube through the support member to a location external of the clutch housing.

17. A clutch assembly according to claim 16 in which the output shaft is hollow and a power take-off shaft is disposed coaxial within the hollow output shaft, a portion of said second conduit means being provided by a passageway formed by clearance between the external surface of the power take-off shaft and the internal surface of the output shaft.

* * * * *